Oct. 31, 1967
O. D. LOVIG
3,349,603
SICKLE BAR ANVIL
Filed Feb. 19, 1965
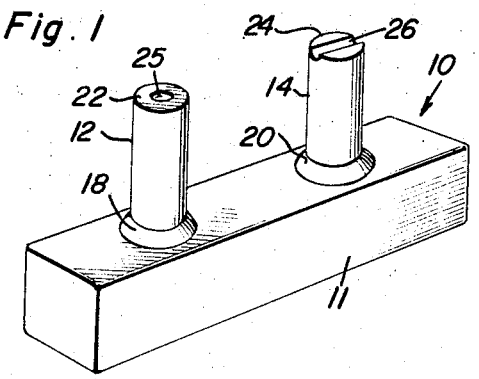
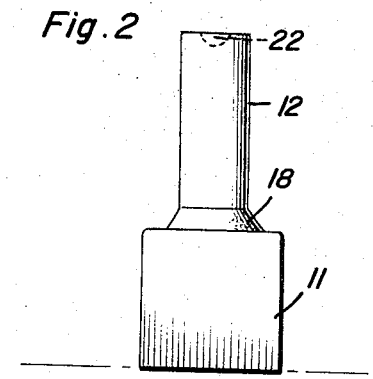
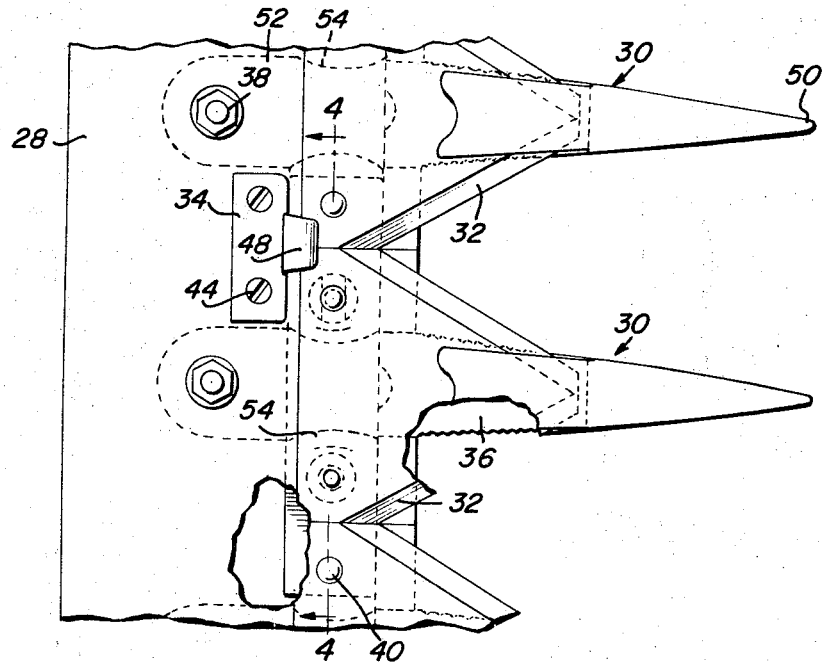
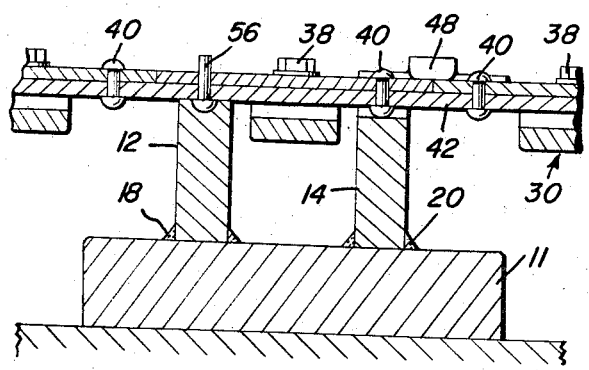
Olin D. Lovig
INVENTOR.
BY *Clarence A. O'Brien*
and *Harvey B. Jacobson*
Attorneys 3,349,603
SICKLE BAR ANVIL
Olin D. Lovig, R.F.D. 3, Villisca, Iowa 50864
Filed Feb. 19, 1965, Ser. No. 434,028
5 Claims. (Cl. 72—477)

ABSTRACT OF THE DISCLOSURE

A rigid abutment structure including two laterally displaced coplanar faces spaced apart with a symmetrical rivet head receiving socket formed in one face and a semi-cylindrical rivet head receiving groove extending laterally across the other face, said socket and groove being of the same depth and the groove extending at least generally toward and away from the socket.

---

This invention relates to a tool for securing plates together by striking rivets in the plates to be riveted against an anvil, and more particularly this invention relates to a sickle bar anvil for striking rivets in a section blade and a cutter bar against the sickle bar anvil to thereby fasten the section blades to the cutter bar.

It is a primary object of this invention to provide a tool for riveting section blades to a cutter bar in a mowing bar arrangement. The tool has anvils protruding therefrom which are designed to enable the anvils to extend between the guards to change a section without removing the cutter bar from the mover.

Prior to this invention it has been necessary to remove the cutting bar from the sickle bar by disconnecting the cutting bar from its connection to the driving pitman, and place the cutting bar on an anvil disposed at a different location to thereby remove the loose section blade, and rivet a new section blade to the cutting bar. This invention provides a means whereby an anvil is constructed to fit in the recess grooves in the neck of the guard. The anvil may be placed under the guard and against the cutting bar while the cutting bar is still attached to its driving pitman thereby facilitating replacement of section blades.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the tool of this invention, showing two cylindrical anvils attached to a bar, which anvils have recesses therein for receiving the rivets connecting a section blade to the cutting bar in a sickle bar;

FIGURE 2 is an end view of the tool of this invention;

FIGURE 3 is a plan view of a sickle bar, the sickle bar being broken away on two sides thereof, and showing the anvils of the tool of this invention placed under the sickle bar in dotted lines, and being received in the neck recesses of the guard of the sickle bar; and FIGURE 4 is a cross sectional view of the sickle bar, and of the tool of this invention taken substantially along the section line 4—4 of FIGURE 3 and showing a rivet to be attached to a section blade, and cutting bar placed in a socket recess in one of the anvils whereby the rivet may be secured to the section blade, and cutting bar.

Referring now more particularly to the drawings, the tool 10 of this invention comprises a block 11, of substantial weight and bulk and two cylindrical anvils 12 and 14 attached to the block by welds 18 and 20. The anvils 12 and 14 preferably extend normal to the top face of the block 11, and have recesses in their upper faces 22 and 24 respectively. The anvil 12 has a semi-spherical socket recess 25 therein, which socket recess lies on the axis of the cylindrical anvil 12. The anvil 14 has a semi-cylindrical groove 26 in the top face 24 thereof, which groove recess 26 is disposed along a diameter of the cylindrical anvil 14, and is disposed along a line passing through the center of the socket recess 25 of the anvil 12.

A portion of the sickle bar 28 is shown in FIG. 3 comprising the sickle bar 28, two guards 30, section blades 32, and a clip 34 for forcing, or holding the section blades 32 down against a ledger plate 36 which is affixed to the guard 30. The guards 30 are attached to the sickle bar 28 by bolts 38 which pass through the sickle bar and through the guards to secure the guards to the sickle bar. The section blades 32 are secured by rivets 40 to a cutter bar 42 which is adapted to reciprocate back and forth in a groove provided therefor in the sickle bar 28. The clip 34 is attached to the sickle bar 28 by screws 44, and is attached to the sickle bar adjacent to the backs of the section blades so that the clip head 48 bears down on the top of the section blades at the back thereof to force the section blades 32 down on the ledger plate 36 secured to the guard 30. The guards 30 extend in front of the section blades in a converging manner toward an apex 50, which is designed to prevent the section blades from running into hard objects which might damage the blades. A neck portion 52 of the guards 30 extends under the section blades and to the rear thereof to a position where the guards may be attached to the sickle bar 28 by the bolts 38. Arcuate recesses 54 are provided in the neck portion of the guards 30. The tool of this invention is designed to fit under the sickle bar and to come against the underside of the cutter bar 42 with the rivets 40 securing the section blades to the cutter bar receivably disposed in the rivet recesses 25 and 26 provided in the flat faces 22 and 24 of the anvils 12 and 14. The cylindrical anvils 12 and 14 are adapted to be received in the arcuate recesses or grooves 54 of the guards 50.

In using the tool of this invention to secure a section blade to a cutting bar in a sickle bar arrangement, the tool 10 is placed under the sickle bar with the anvils 12 and 14 of the tool disposed in the recesses 54 of the guards 30. The rivet receiving recesses 25 and 26 in the top face of the anvils 12 and 14 are placed over the bottom projections of the rivets retaining the section blade to the cutting bar. The recess 26 in the cylindrical anvil 14 is disposed laterally along the top face 24 of the anvil 14 so that various sized blades may be worked with the anvil with rivets of different spaced distances apart being received in the semi-cylindrical recess 26 along different portions of the recess 26. When the rivets have been received in the rivet receiving recesses, comprising the socket 25 in the anvil 12 and the groove 26 in the anvil 14, the rivets may be secured to the section blade and the cutting bar and thereby secure the blade to the bar by striking against the top face 56 of the rivet to be so secured. The anvils 12 and 14 will serve to hold the sickle bar 28 off the ground and will provide a support therefor, so that the sickle bar 28 does not rest on the ground. In the event that a rivet is to be removed from the section blade 32, the blade may be moved along the sickle bar 28 to a distance wherein the rivets 40 will be disposed alongside of the anvils 12 and 14, and then the rivets may be driven out of engagement with the blade and bar by hammering the rivets out of their holes in the bar and blade with a mallet and punch.

In a preferred embodiment of this invention, the tool is made from steel. The block 11 is preferably one inch square by 4½ inches long, and is solid. The cylindrical anvils 12 and 14 are preferably ½" in diameter by 1½" in height, and are solid except for the rivet receiving recesses in the top faces of the anvils. The anvils 12 and 14 are spaced 2″ apart on the centers thereof, and are arranged symmetrically on the block 11. The anvils are welded to the block by conventional welds 18 and 20.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tool comprising a block, a pluarlity of anvils projecting from said block and normal thereto, said anvils being connected at their lower ends to said block, one of said anvils having a socket recessed therein providing a portion for receiving the head of a rivet for solid striking of a rivet against said socket, a second of said anvils including a semi-cylindrical rivet receiving groove therein at the top thereof extending laterally across said second anvil, said second anvil being flat on the top thereof to permit a plate to bear thereagainst on opposite sides of said groove.

2. An anvil means having two laterally displaced coplanar faces spaced apart, said anvil means being substantially solid for striking objects thereagainst, a symmetrical rivet head receiving socket recessed in one face, a semi-cylindrical rivet head receiving groove extending laterally across the second face, said socket and said groove being of the same depth and said groove extending at least generally toward and away from said socket.

3. A tool for striking objects thereagainst, comprising a substantially solid block, two substantially solid cylindrical anvils projecting outwardly of one side of said block and including spaced apart coplanar abutment surfaces facing away from said block, a rivet receiving socket recessed in a first one of said surfaces, a rivet receiving groove extending fully across the other of said surfaces and generally toward and away from said socket, said socket and said groove being of the same depth.

4. A tool for striking objects thereagainst comprising, a block, a plurality of anvils projecting from said block and connected thereto, said anvils having top faces thereon disposed along a substantially common plane whereby a substantially flat surface to be worked may be laid across said faces, said anvils being cylindrical in configuration and being substantially solid, a rivet receiving socket in the center of the top face of one anvil and a substantially semi-cylindrical groove diametrically disposed in the top face of a second anvil along a line projecting substantaily through the center of said socket, said first and second anvils being disposed on said block a substantial distance apart whereby an elongate object of substantial length may be placed across said anvils and supported thereby.

5. For use with a sickle bar having a cutting bar adapted to reciprocate on said sickle bar, a section blade riveted to said cutting bar, and a guard secured to said sickle bar and being disposed under said section blade in supporting relationship therewith, said guard having sides which are recessed in a neck portion thereof, a tool comprising a block including two elongated upstanding anvils secured to said block and extending upwardly therefrom, said anvils including planar upper end faces having upwardly opening and equal depth rivet head receiving recesses in the top faces thereof, said anvils having adjacent curved side surfaces, and said tool being adapted to be disposed under and to support said sickle bar with the curved surfaces of the anvils extending in the recessed sides of the guard and with the heads of selected rivets in said section blade and cutting bar being received in the rivet head receiving recesses in the anvil.

References Cited
UNITED STATES PATENTS

| | | | |
|---|---|---|---|
| 626,802 | 6/1899 | Zamboni | 29—243.54 |
| 3,182,442 | 5/1965 | Granberg | 59—7 |
| 3,233,402 | 2/1966 | Urbaitis | 59—7 |
| 3,234,634 | 2/1966 | Johnson | 59—7 |

G. P. CROSBY, *Assistant Examiner.*

CHARLES W. LANHAM, *Primary Examiner.*